United States Patent [19]

Kuhns

[11] Patent Number: 5,340,142
[45] Date of Patent: Aug. 23, 1994

[54] TOWING TONGUE ASSEMBLY
[75] Inventor: Abe B. Kuhns, Arthur, Ill.
[73] Assignee: E-Z Trail, Inc., Arthur, Ill.
[21] Appl. No.: 31,832
[22] Filed: Mar. 10, 1993
[51] Int. Cl.5 .................................... B62D 13/02
[52] U.S. Cl. .................. 280/444; 280/494; 280/89
[58] Field of Search ............ 280/492, 493, 494, 426, 280/444, 419, 81.6, 456.1, 460.1, 461.1, 280, 279, 89, 94

[56] References Cited

U.S. PATENT DOCUMENTS

| | | | |
|---|---|---|---|
| 1,257,454 | 2/1918 | Brady | 280/493 |
| 1,496,993 | 6/1924 | Marcott | 280/444 |
| 3,455,572 | 7/1969 | Wolf | 280/444 |
| 3,477,742 | 11/1969 | Barrington | 280/444 |
| 3,806,160 | 4/1974 | Duerksen | 280/444 |
| 4,445,703 | 5/1984 | Tange | 280/279 |
| 4,531,756 | 6/1985 | Mori | 280/279 |
| 4,579,362 | 4/1986 | Kirkpatrick | 280/444 |
| 4,655,467 | 4/1987 | Kitzmiller et al. | 280/444 |
| 4,946,181 | 8/1990 | Romano | 280/280 X |
| 5,246,296 | 9/1993 | Chi | 280/279 X |

FOREIGN PATENT DOCUMENTS 0129447 2/1929 Switzerland ................ 280/444

Primary Examiner—Margaret A. Focarino
Assistant Examiner—Florian Zeender
Attorney, Agent, or Firm—Lockwood, Alex, Fitzgibbon & Cummings

[57] ABSTRACT

A towing assembly for towing a steerable vehicle chassis includes a pin having a flat side which is fixed to the front face of the front rail of the chassis, and a steering frame which is rotatably mounted to the pin by way of a cylindrical bearing containing sleeve on the steering frame. A cup-shaped cap overlies the sleeve and the bearings to protect them against contamination, and the cap is rigidly fixed to the pin and front chassis rail to increase the strength and integrity of the mounting of the towing assembly to the chassis.

28 Claims, 2 Drawing Sheets

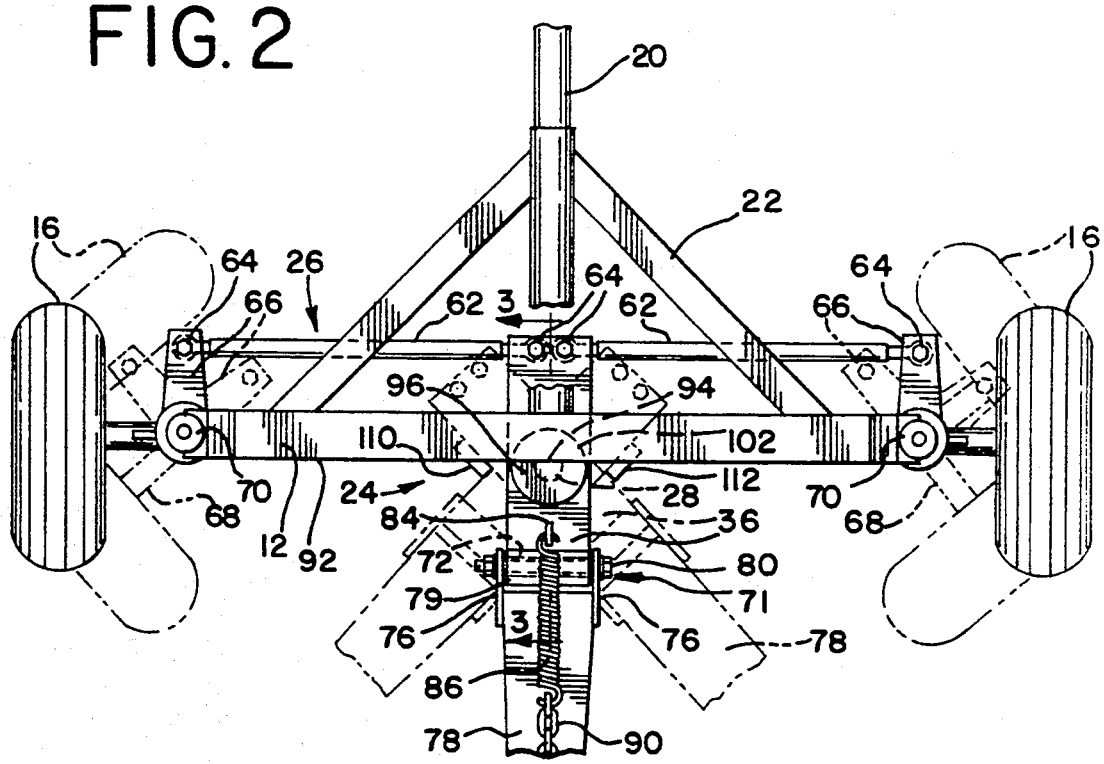
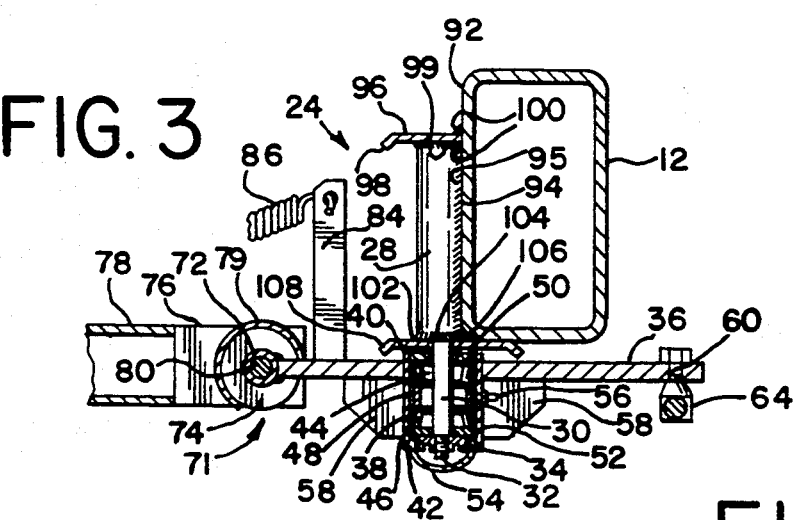
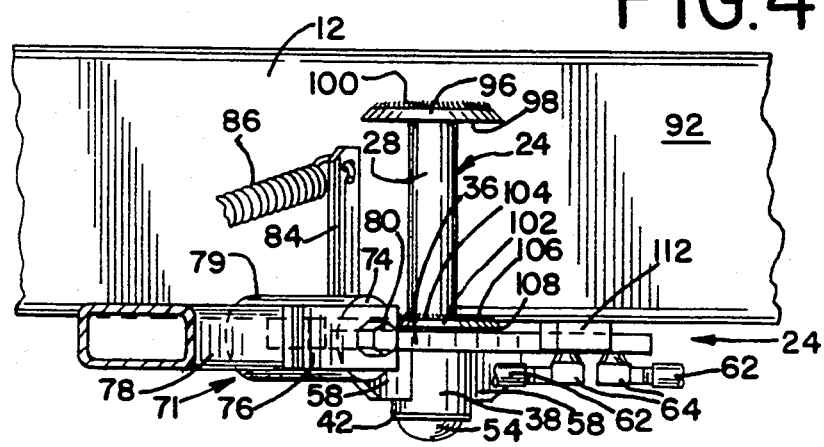

TOWING TONGUE ASSEMBLY

BACKGROUND & SUMMARY OF THE INVENTION

The present invention relates to a towed steerable vehicle and, more particularly, to a towing assembly for such vehicle.

Towed vehicles which are towed by a towing vehicle, such as a tractor, are widely used in a number of applications, such as for example in the agricultural field in the form of grain carts and the like. These towed vehicles usually include a steering assembly at the front axle or rail of the chassis frame of the vehicle which steers the front wheels when the towing vehicle and the towed vehicle negotiate a turn.

Such steering assemblies typically include a towing assembly having a king pin which is fixed to and extends upwardly through and is fixed through the front axle or rail of the chassis, and a steering frame which is rotatably mounted to the king pin for rotation relative to it. Some prior assemblies have also mounted the king pin well forward of the front axle or rail on support arms. In both such prior through and forward mounted assemblies, a towing tongue may either be formed as part of the steering frame or more usually is movably mounted to the front thereof. The towing tongue has a hitch at its leading end for attachment to a hitch on the towing vehicle. The prior steering assemblies have also typically included conventional tie rods and ball joint mountings on the tie rods which are attached at one end to the steering frame and at the other end to a steering arm on the spindles upon which the steerable wheels are mounted. Thus, when the vehicle is to negotiate a turn, the steering frame rotates to the right or left about the king pin to cause the tie rods to turn the wheels in one direction or the other to steer the vehicle.

The mounting of the king pin through the front axle or rail of the vehicle chassis has the advantage of structural strength and integrity which is important where the vehicle must handle substantial loads and withstand substantial forces during use without damage. This is particularly important in agricultural vehicles which frequently operate under off the road conditions and on uneven terrain. However, such mountings generally result a relatively large turning radius which is particularly disadvantageous, for example, in some agricultural vehicles which must turn sharply at the end of a crop row. The forward mounted assemblies enjoy the advantage of reduced turning radius, but suffer from substantially reduced strength and integrity. All of the prior assemblies, whether through or forward mounted, suffered from contamination from water, dirt and the like of the bearing assembly by which the steering frame is rotatably mounted to the king pin.

In the towing assembly of the present invention the king pin is mounted to the forward face of the chassis front rail, rather than through it or well forward of it as in the prior assemblies. Such frontal mounting has the advantage of a substantial reduction in the turning radius of the vehicle. However, unlike the prior forwardly mounted towing assemblies, in the frontally mounted assembly of the present invention, the level of strength and integrity of the mounting is equal to or greater than that which is otherwise enjoyed by the prior through mounted assemblies, while at the same time the bearing assembly is protected against contamination.

In one principal aspect of the present invention, a towing assembly for towing a steerable vehicle chassis in a forward direction includes an elongate front chassis rail adapted to receive steerable wheels adjacent its ends, and an elongate pin having a flat side is rigidly fixed directly to a front face of the front chassis rail, and the pin has a substantially vertical axis. An elongate steering frame extends at an angle to the front chassis rail. The elongate steering frame includes tie rod mounting means thereon for mounting tie rods thereto which are adapted to extend to the steerable wheels to steer them as the chassis is being towed, and also includes hitching means adjacent the forward end for hitching the elongate steering frame to a towing vehicle. The elongate steering frame is mounted forward of the front rail and for rotation about the pin in a plane substantially perpendicular to the vertical axis of the pin so that rotation of the elongate steering frame about the pin when the chassis was being towed steers the steerable wheels.

In another principal aspect of the present invention, the steering frame extends both forward and to the rear of the front chassis rail, the tie rod mounting means is positioned to the rear of the front chassis rail and the hitching means is positioned forward of the front chassis rail. In still another principal aspect of the present invention, the steering frame is positioned beneath the front chassis rail.

In still another principal aspect of the present invention, a pair of stops are positioned on the front chassis rail and on each side of the steering frame, and the stops extend forwardly of the front chassis rail and simultaneously contact each side of the steering frame to limit the rotation of the steering frame about the pin.

In still another principal aspect of the present invention, the steering frame is rotatably mounted to the pin by a cylindrical sleeve which extends through and is fixed to the steering frame, the sleeve having a top end which opens upwardly of the steering frame and a bottom end which opens downwardly of the steering frame, and a portion of the pin extends into the sleeve. A bearing assembly in the sleeve mounts the sleeve and its steering frame for rotation relative to the portion of the pin which extends into the sleeve. A cap overlies the top of the sleeve to protect the bearing assembly against contamination through the top end of the sleeve.

In still another principal aspect of the present invention, the cap is cup-shaped.

In still another principal aspect of the present invention, the cap is fixed to the pin and/or the front chassis rail.

In still another principal aspect of the present invention, the aforementioned hitching means includes a substantially horizontal sleeve adjacent the forward end of the steering frame, and a pin through the sleeve for hitching the end of a towing tongue to the horizontal sleeve to permit the towing tongue to rotate in a vertical direction relative to the horizontal sleeve and the steering frame.

These and other objects, features and advantages of the present invention will be more clearly understood through a consideration of the following detailed description.

BRIEF DESCRIPTION OF THE DRAWINGS

In the course of this description, reference will frequently be made to the attached drawings in which:

FIG. 2 is a broken plan view of the front rail of the chassis shown in FIG. 1, and showing the vehicle steering assembly including the preferred embodiment of towing assembly of the present invention with various steering positions indicated in dot and dash;

FIG. 3 is a broken cross-sectioned side elevation view of the preferred embodiment of towing assembly of the present invention, as viewed substantially along lines 3—3 of FIG. 2; and FIG. 4 is a broken front elevation view of the front chassis rail and the preferred embodiment of towing assembly of the present invention.

DESCRIPTION OF THE PREFERRED EMBODIMENT

Figure 1:
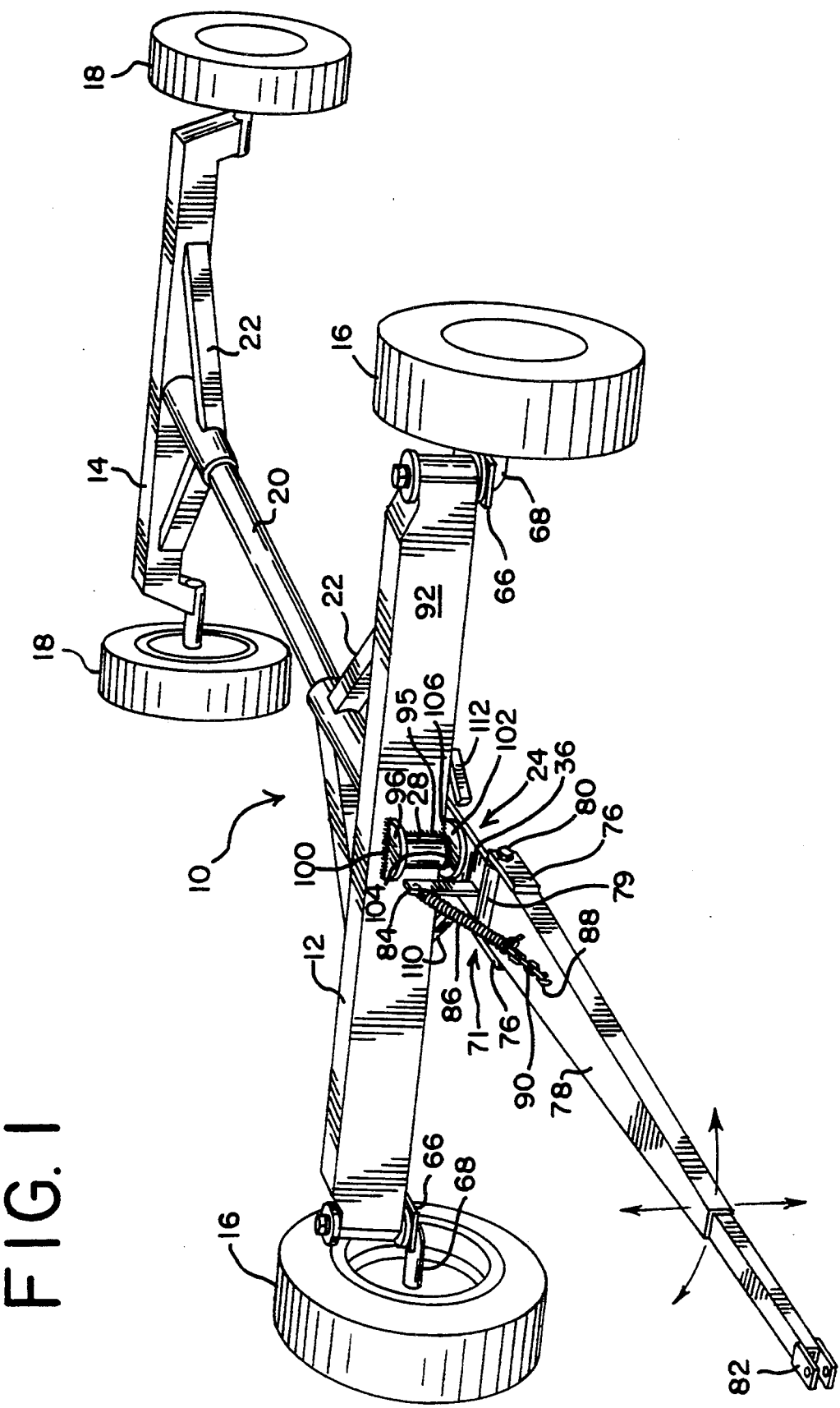
FIG. 1 is a perspective view of a steerable vehicle chassis including a preferred embodiment of towing assembly of the present invention.

A vehicle chassis is shown in FIG. 1 which includes a steering assembly which, in turn, includes a preferred embodiment of towing assembly constructed in accordance with the principles of the present invention.

As shown in FIG. 1 the chassis, generally 10, preferably comprises a pair of rails, including a front rail or axle 12 and a rear rail or axle 14. The rails 12 and 14 are longitudinally spaced from each other along the chassis and extend transversely thereof. Front wheels 16 are mounted for rotation at the ends of the front rail 12, and rear wheels 18 are mounted at the ends of the rear rail 14. The front wheels 16 are steerable as will be described in more detail to follow, whereas the rear wheels 18 need not be and are typically not steerable. The rails 12 and 14 are firmly coupled to each other by a center beam 20 to complete the chassis frame for the vehicle. In the single center beam construction shown, diagonal struts 22 are also preferably provided which extend between the center beam 20 and the front and rear rails 12 and 14 to strengthen the chassis frame. Although only a single center beam 20 is shown, it will be understood that more than one beam may be provided if desired, either in place of or in addition to the center beam 20.

A towing assembly, generally 24, of the preferred embodiment of the present invention forms a part of an overall steering assembly 26, as best seen in FIG. 2, for steering the wheels 16 of the vehicle as it is being towed.

The towing assembly 24 generally comprises a vertically extending king pin 28 which preferably extends upwardly along a vertical axis. As best seen in FIG. 3, pin 28 also preferably includes a reduced diameter portion 30, and a still further reduced diameter portion 32 which is threaded to receive a nut 34.

The towing assembly 24 also includes a steering frame 36 which extends beneath the front chassis rail 12 and the pin 28. The steering frame 36 is preferably formed of a heavy gauge flat strong metal plate. However, it will be appreciated that the steering frame 36 may have a variety of other forms and shapes without departing from the scope of the invention. A tubular sleeve 38, as best seen in FIGS. 3 and 4, extends through and is fixed to the steering frame 36, as by welding. The top end 40 of the sleeve 38 opens upwardly from the upper surface of the steering frame 36, and the bottom end 42 opens downwardly from the undersurface of the steering frame, as shown in FIG. 3.

One or more sets of roller bearings 44 and 46 are installed in the sleeve 38, as shown in FIG. 3. If more than one set of roller bearings are installed therein, a spacer 48 is preferably positioned in the sleeve 38 to space the bearings 44 and 46 from each other. The spacer 48 may either be formed as a separate element or it may be formed integrally with the internal surface of the cylindrical sleeve 38. A washer 50 is positioned in the top end 40 of the sleeve 38 for closing the top end of the sleeve to minimize contamination from dirt and water to the extent possible. A washer 52 may also be positioned adjacent and beneath the bottom bearings 46. The nut 34 is threaded on the threaded further reduced diameter pin 32, as best seen in FIG. 3, to bear against the washer 52 to hold the bearings in the sleeve 38. The reduced diameter pin portion 30 is journaled through the bearings 44 and 46 for rotation of the steering frame 36 in a generally horizontal plane about the vertical axis of the pin 28 and its reduced diameter portion 30.

A domed or other shaped closure cap 54 is also preferably provided to close the bottom end 42 of the cylindrical sleeve 38. The closure cap 54 seals the sleeve 38 and its bearings 44 and 46 against contamination from the bottom end 42 of the sleeve, and to hold lubricant within the bearing containing chamber defined by the sleeve 38. A grease fitting 56 is also preferably provided through the sleeve 38 for adding lubricant to the bearings 44 and 46. In addition one or more strengthening gussets 58 also preferably extend from the sleeve 38 beneath the steering frame 36 and are welded to both to rigidify the sleeve mounting to the steering frame.

A pair of openings 60 are positioned in and to the rear of the steering frame 36 and to the rear of the front rail 12, as best seen in FIG. 3. The openings 60 provide mounting sites for tie rods 62 of the steering assembly 26. The tie rods 62 have conventional ball and socket end mounts 64 at each end. The ball and socket mounts on the inner ends of the tie rods 62 are mounted in the respective openings 60 to the steering frame, and the ball and socket mounts on the outer ends of the tie rods 62 are similarly mounted in openings through steering arms 66 which are fixed to rotatable wheel spindles 68 on each of the wheels 16, as best seen on FIGS. 1 and 2.

The wheel spindles 68 preferably have two portions which extend at right angles to each other with the vertical portion of the spindles extending upwardly in journaled relationship through cylindrical spindle sleeves 70. The spindle sleeves 70 are welded at the outer ends of the front rail 12 and permit rotation of the wheel spindles 68 therein to steer the wheels 16. Thus, it will be seen that when the steering frame 36 is rotated in the horizontal plane about the reduced diameter pin 30 of pin 28, the wheels 16 will be steered by way of the tie rods 62 and steering arms 66 as is typical in a steering assembly.

A hitching assembly 71 including an elongate horizontal hitching sleeve 72 is also fixed at the other end of the steering frame 36, as best seen in FIG. 3. The horizontal hitching sleeve 72 preferably carries an enlarged washers 74 which is welded at each end to act as a bearing surface for a pair of spaced legs 76, which in turn are welded to the rear end of a towing tongue 78. A partially cylindrical sleeve 79 preferably encircles the horizontal hitching sleeve 72 and extends between and is fixed at its ends to the enlarged washers 74, as by welding, to strength the hitching assembly.

Each of the legs 76 on the end of the tongue 78 has an opening therethrough to receive a hinging bolt 80 which extends through the horizontal hitching sleeve 72 to hinge the tongue 78 for movement up and down relative to the steering frame 36, as shown by the vertical arrows in FIG. 1. The leading end of the towing tongue 78 also carries a hitch 82 for hitching the front of the tongue to a hitch on the towing vehicle (not shown).

A spring assembly is also preferably provided which includes an upstanding bracket or arm 84 which is welded at its bottom end to the upper face of the steering frame 36, and to which a spring 86 is attached at its upper end. A loop 88 is preferably welded to the upper surface of the towing tongue 78, and a few links of chain 90, as best seen in FIGS. 1 and 2, are attached to the loop. The end of the spring 86 opposite the arm 84 is selectively hooked to one of the links of chain 90. Thus, the chain 90 permits adjustment of the tension of the spring 86, depending upon in which loop of the chain the spring is attached.

An important feature of the present invention is that the towing assembly 24 of the present invention is mounted to rotate forward of the front face 92 of the front chassis rail 12. Such forward mounting of the towing assembly 24 realizes a substantial decrease in the turning radius of the vehicle. Thus, as best seen in FIG. 3, the back side 94 of the pin 28 is preferably flattened somewhat to fit flush and seat firmly against the front face 92 of the front chassis rail 12. The flattened back side 94 of the pin 28 also enables the pin to be welded at welds 95 on both sides and over its height to the front face 92 of the front chassis rail 12. This results in a substantial improvement in the strength and integrity of the mounting.

An upper semicircular cap 96 is also preferably included in the assembly. Cap 96 has a somewhat downturned cup-like edge 98 and is positioned at the top of the pin 28. The underside of the cap 96 is welded at weld 99 to the top of the pin 28, and both the underside and top side of the cap 96 where they abut the front face 92 of the rail 12, are welded by welds 100 to the front face, as best seen in FIG. 3. The cap 96 with its weld 99 to the pin 28 and welds 100 to the front face 92 of the front rail 12 further increase the strength and integrity of the mounted towing assembly 24. Moreover, the downturned cup-like edge 98 also increases the strength of the mounting.

In the preferred embodiment of invention a second cap 102 is also welded by welds 104 to the bottom of the pin 28, and by welds 106 between its top and the front face 92 of the front rail chassis 12, as best seen in FIG. 3. Cap 102 also preferably includes a downturned cup-like rim 108. The underside of the cap 102 is spaced slightly above the top end 40 of the cylindrical sleeve 38, as best seen in FIG. 3, and the cap 102 is somewhat larger in diameter than the diameter of the sleeve 38.

The cap 102 simultaneously performs at least two important functions in the towing assembly of the present invention. It substantially reenforces the structural strength and integrity of the mounting of the towing assembly 24 and its pin 28 to the front rail 12 by virtue of the strength of the cap itself and its downturned edge 108, and by providing additional sites for the welds 104 and 106. Additionally, because the cap is considerably larger in diameter than the diameter of the cylindrical sleeve 38 and because of its downturned edge 108, it protects against the ingress of contaminants past the top end 40 of the sleeve 38 and the washer 50, and into the bearings 44 and 46. This is particularly important in the case of a towed vehicle which is to be left outside and exposed to the elements for substantial periods of time, such as agricultural vehicles typically are.

To complete the towing assembly 24 of the present invention, a pair of stops 110 and 112 are also preferably welded to the underside of the front chassis rail 12. The stops 110 and 112 extend forwardly and outwardly of the front rail 12, and at an angle thereto and toward the sides of the steering frame 36. The stops 110 and 112 are positioned on each side of the steering frame 36, as best seen in FIGS. 1 and 2, to limit the safe movement of the steering frame to the extreme right and left. Thus, as the steering frame 36 moves to the furthest left, for example and as shown in dot and dash in FIG. 2, its left edge will bear against the end of the stop 110, and its right longitudinal edge will simultaneously bear against the longitudinal side of the stop 112 to firmly restrict the movement of the steering frame 36 to the maximum left. Simultaneous contact with the stops results in a substantial improvement in strength and decreased likelihood of damage to the towing and steering assemblies. When the steering frame 36 is moved toward the maximum right, the action of the stops 110 and 112 is reversed.

It will be understood that the embodiment of the present invention which has been described is merely illustrative of one of the applications of the principles of the invention. Numerous modifications may be made by those skilled in the art without departing from the true spirit and scope of the invention.

I claim:

1. A towing assembly for towing a steerable vehicle chassis in a forward direction, said assembly comprising:

an elongate front chassis rail having a front face and adapted to receive steerable wheels adjacent its ends;

an elongate pin having a flat side rigidly fixed directly to the front face of said front chassis rail and having a substantially vertical axis;

an elongate steering frame extending at an angle to said front chassis rail, said elongate steering frame including tie rod mounting means thereon for mounting tie rods thereto which are adapted to extend to the steerable wheels to steer them as the chassis is being towed, and also including hitching means adjacent the forward end thereof for hitching the elongate steering frame to a towing vehicle; and mounting means forward of said front chassis rail for mounting said elongate steering frame for rotation about said pin in a plane substantially perpendicular to the vertical axis of said pin; whereby rotation of said elongate steering frame about said pin when the chassis is being towed steers the steerable wheels.

2. The towing assembly of claim 1, wherein said elongate steering frame extends both forward and to the rear of said front chassis rail, said tie rod mounting means being positioned to the rear of said front chassis rail, and said hitching means being positioned forward of said front chassis rail.

3. The towing assembly of claim 1, wherein said elongate steering frame is positioned beneath said front chassis rail.

4. The towing assembly of claim 1, including a pair of stops on said front chassis rail and on each side of said elongate steering frame, said stops extending forwardly of the front chassis rail and simultaneously contacting each side of said steering frame to limit the rotation of said elongate steering frame about said pin.

5. The towing assembly of claim 1, wherein said mounting means comprises;
   a cylindrical sleeve which extends through and is fixed to said elongate steering frame, said sleeve having a top end which opens upwardly of said steering frame and a bottom end which opens downwardly of said steering frame, a portion of said pin extending into said sleeve;
   a bearing assembly in said sleeve mounting said sleeve and its steering frame for rotation relative to the portion of said pin which extends into said sleeve; and
   a cap overlying the top of said sleeve to protect said bearing assembly against contamination through the top end of said sleeve.

6. The towing assembly of claim 5, wherein said cap is fixed to said pin.

7. The towing assembly of claim 6, wherein said cap is also fixed to said front chassis rail.

8. The towing assembly of claim 5, wherein said cap is fixed to said front chassis rail.

9. The towing assembly of claim 5, wherein said cap is cup-shaped.

10. The towing assembly of claim 7, wherein said cap is fixed adjacent the bottom of said pin, and a second cap fixed to said pin and said front chassis rail adjacent its top.

11. The towing assembly of claim 1, wherein said hitching means comprises a substantially horizontal sleeve adjacent the forward end of said steering frame, and a pin through said sleeve for hitching the end of a towing tongue to said horizontal sleeve to permit the towing tongue to rotate in a vertical direction relative to said horizontal sleeve and said steering frame.

12. The towing assembly of claim 1, wherein said elongate steering frame extends both forward and to the rear of said front rail, said tie rod mounting means being positioned to the rear of said front rail, and said hitching means being positioned forward of said front rail; and
   a pair of stops on said front rail and on each side of said elongate steering frame and extending forwardly of said front chassis rail, said stops simultaneously contacting each side of said steering frame to limit the rotation of said elongate steering frame about said pin.

13. The towing assembly of claim 12, wherein said mounting means comprises;
   a cylindrical sleeve which extends through and is fixed to said elongate steering frame, said sleeve having a top end which opens upwardly of said steering frame and a bottom end which opens downwardly of said steering frame, a portion of said pin extending into said sleeve;
   a bearing assembly in said sleeve mounting said sleeve and its steering frame for rotation relative to the portion of said pin which extends into said sleeve; and
   a cup shaped cap overlying the top of said sleeve to protect said bearing assembly against contamination through the top end of said sleeve.

14. The towing assembly of claim 13, wherein said cap is fixed to said pin.

15. The towing assembly of claim 14, wherein said cap is also fixed to said front chassis rail.

16. The towing assembly of claim 14, wherein said cap is fixed to said front chassis rail.

17. The towing assembly of claim 15, wherein said cap is fixed adjacent the bottom of said pin, and a second cap fixed to said pin and said front chassis rail adjacent its top.

18. A towing assembly for towing a steerable vehicle chassis, said assembly comprising:
   an elongate pin having a substantially vertical axis;
   an elongate steering frame extending at an angle to the vertical axis of said pin, said elongate steering frame including tie rod mounting means thereon for mounting tie rods thereto which are adapted to extend to wheels on the chassis to steer the wheels as the chassis is being towed, and also including hitching means adjacent an end thereof for hitching the elongate steering frame to a towing vehicle;
   mounting means for mounting said elongate steering frame for rotation about said pin in a plane substantially perpendicular to the vertical axis of said pin; whereby rotation of said elongate steering frame when the chassis is being towed steers the steerable wheels, said mounting means including a cylindrical sleeve which extends through and is fixed to said elongate steering frame, said sleeve having a top end which opens upwardly of said steering frame and a bottom end which opens downwardly of said steering frame, said pin having a first non-rotatable portion extending into said sleeve, and a second portion extending from said sleeve, said second portion being constructed to be fixed to the chassis to fix said pin against rotation;
   a bearing assembly in said sleeve mounting said sleeve and its steering frame for rotation relative to the first non-rotatable portion of said pin which extends into said sleeve; and
   a non-rotatable cap overlying the top end of said sleeve to protect said bearing assembly against contamination through the top end of said sleeve, said sleeve being rotatable relative to said non-rotatable pin and cap.

19. The towing assembly of claim 18, wherein said steering frame, sleeve and cap are positioned adjacent the bottom of said pin.

20. The towing assembly of claim 18, wherein said hitching means comprises a substantially horizontal sleeve adjacent the end of said steering frame, and a pin through said sleeve for hitching the end of a towing tongue to said horizontal sleeve to permit the towing tongue to rotate in a vertical direction relative to said horizontal sleeve and said steering frame.

21. The towing assembly of claim 18, wherein said cap is fixed to said pin.

22. The towing assembly of claim 21, wherein said cap is cup-shaped.

23. The towing assembly of claim 18, wherein said cap is cup-shaped.

24. A towing assembly for towing a steerable vehicle chassis in a forward direction, said assembly comprising:
   an elongate front chassis rail adapted to receive steerable wheels adjacent its ends;
   an elongate pin rigidly fixed to the chassis forward of said front chassis rail and having a substantially vertical axis;
   an elongate steering frame having opposite sides, said elongate steering frame extending at an angle to said front chassis rail and forward thereof, said elongate steering frame including tie rod mounting means thereon for mounting tie rods thereto which are adapted to extend to the steerable wheels to steer them as the chassis is being towed, and also including hitching means adjacent the forward end thereof for hitching the elongate steering frame to a towing vehicle;

mounting means forward of said front chassis rail for mounting said elongate steering frame for rotation about said pin in a plane substantially perpendicular to the vertical axis of said pin; whereby rotation of said elongate steering frame about said pin when the chassis is being towed steers the steerable wheels; and a pair of stops one on each side of said elongate steering frame said steering frame moving into simultaneous contact with each of said stops to limit the rotation of said elongate steering frame about said pin.

25. The towing assembly of claim 24, wherein said pair of stops are mounted on said front chassis rail and extend forwardly thereof.

26. The assembly of claim 25, wherein each of said stops is elongate and has a front end and a side, and wherein one side of said steering frame contacts the end of one stop and the other side simultaneously contacts the side of the other stop when said steering frame is rotated to its limit in one direction, and the other side of said steering frame contacts the end of the other stop and said one side simultaneously contacts the side of said one stop when said steering frame is rotated to its limit in the opposite direction.

27. The towing assembly of claim 24, wherein each of said stops is elongate and has a front end and a side, and wherein one side of said steering frame contacts the end of one stop and the other side simultaneously contacts the side of the other stop when said steering frame is rotated to its limit in one direction, and the other side of said steering frame contacts the end of the other stop and said one side simultaneously contacts the side of said one stop when said steering frame is rotated to its limit in the opposite direction.

28. The towing assembly of claim 18, wherein said non-rotatable cap is spaced from the top end of said sleeve.

* * * * *